US008950695B2

(12) United States Patent
Johnston et al.

(10) Patent No.: US 8,950,695 B2
(45) Date of Patent: Feb. 10, 2015

(54) FUEL NOZZLE AND PROCESS OF FABRICATING A FUEL NOZZLE

(75) Inventors: Bill Damon Johnston, Easley, SC (US); Daniel Anthony Nowak, Spring, TX (US); Srikanth Chandrudu Kottilingam, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 536 days.

(21) Appl. No.: 13/348,732

(22) Filed: Jan. 12, 2012

(65) Prior Publication Data

US 2013/0181071 A1    Jul. 18, 2013

(51) Int. Cl.
A62C 31/02    (2006.01)

(52) U.S. Cl.
USPC .......................................... 239/589; 239/590

(58) Field of Classification Search
CPC ... F02M 51/0621; F02M 51/066; B05B 12/00
USPC ................. 239/589, 590.5, 591, 596, 533.11, 239/533.12; 29/890.124, 890.127
See application file for complete search history.

(56) References Cited

U.S. PATENT DOCUMENTS

| 5,211,682 | A | * | 5/1993 | Kadowaki et al. | ............ 123/531 |
| 5,358,181 | A | * | 10/1994 | Tani et al. | ...................... 239/409 |
| 5,947,716 | A | * | 9/1999 | Bellamy et al. | ............... 431/159 |
| 6,112,971 | A | | 9/2000 | Castaldo et al. | |
| 6,991,188 | B2 | * | 1/2006 | Kobayashi et al. | ........... 239/596 |
| 2006/0010873 | A1 | | 1/2006 | Henriquez | |
| 2010/0066035 | A1 | | 3/2010 | Berry et al. | |

OTHER PUBLICATIONS

Search Report and Written Opinion from corresponding EP Application No. 13150543.0-1702 dated May 8, 2013.

* cited by examiner

*Primary Examiner* — Davis Hwu
(74) *Attorney, Agent, or Firm* — McNees Wallace & Nurick LLC

(57) ABSTRACT

Disclosed is a fuel nozzle and a process of fabricating a fuel nozzle. The fuel nozzle includes a fuel nozzle end cover and a fuel nozzle insert. The fuel nozzle insert is welded to the fuel nozzle end cover by a welding process selected from the group consisting of beam welding, solid state welding, and combinations thereof and/or the fuel nozzle insert includes a first fuel nozzle insert portion and a second fuel nozzle insert portion. The process includes welding the fuel nozzle insert to the fuel nozzle end cover.

17 Claims, 4 Drawing Sheets

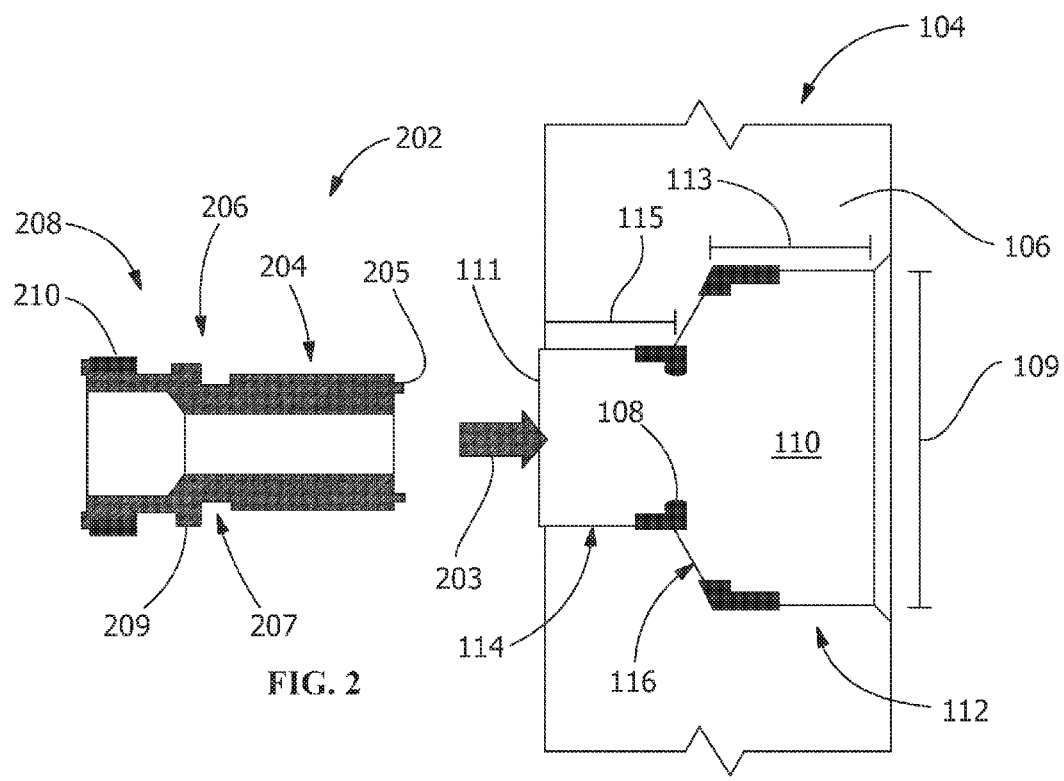
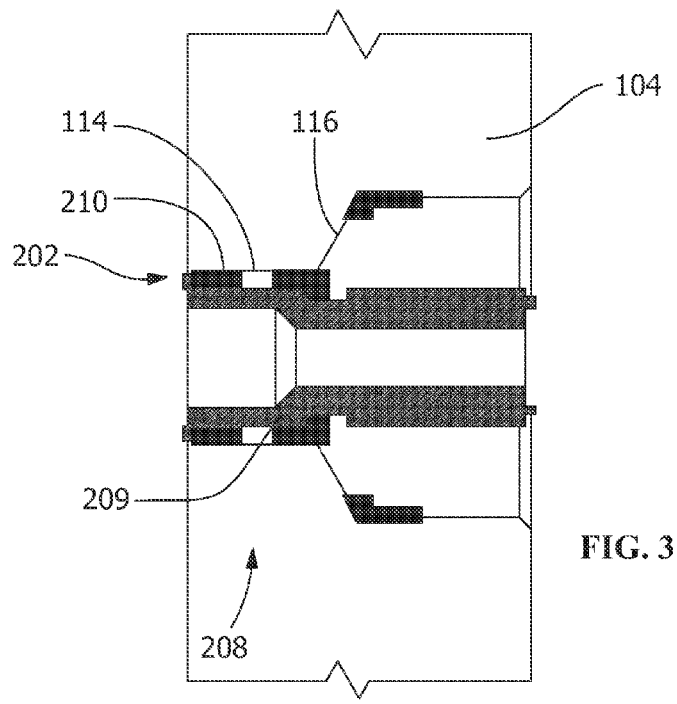

FUEL NOZZLE AND PROCESS OF FABRICATING A FUEL NOZZLE

FIELD OF THE INVENTION

The present invention is directed to fuel nozzles and processes of fabricating fuel nozzles. More particularly, the present invention relates to welded fuel nozzles and processes of fabricating fuel nozzles by welding.

BACKGROUND OF THE INVENTION

In general, gas turbines are being subjected to more demanding operation. Higher temperatures, harsher environments, use in more diverse environments, and extended duration of use result in challenges for gas turbines and their components. Extending the useful life of such components and improving capability for repair of such components can decrease costs associated with the gas turbines and can increase the operational aspects of the gas turbines.

Known end covers on fuel nozzles in gas turbines have an insert brazed into the end cover. Generally, such inserts have four braze joints securing the inserts within the end cover. These braze joints are subject to failure, for example, resulting in leaking proximal to the braze joints. Such braze joints can also suffer from a drawback of requiring frequent repair. Such repairs can be complex and expensive. In addition, the ability to perform such repairs may be limited.

Repair of known end covers can result in further leaking that is not capable of being repaired. For example, when an insert is removed for repair, the braze joints are severed. Repeated severing of the braze joints can result in undesirable operational concerns, such as leaking, that is not capable of being adequately repaired. Known end covers suffer from a drawback of being limited to three such iterations of repeated repair.

Other techniques for securing fuel nozzle inserts within fuel nozzle end covers have been unavailable. In particular, the complex geometry of the insert and the difficulty reaching certain portions within the fuel nozzle when the insert is positioned within the end cover has prevented use of techniques other than brazing.

A fuel nozzle and a process of fabricating a fuel nozzle that do not suffer from one or more of the above drawbacks would be desirable in the art.

BRIEF DESCRIPTION OF THE INVENTION

In an exemplary embodiment, a fuel nozzle includes a fuel nozzle end cover and a fuel nozzle insert. The fuel nozzle insert is welded to the fuel nozzle end cover by a welding process selected from the group consisting of beam welding, solid state welding, and combinations thereof.

In another exemplary embodiment, a fuel nozzle includes a fuel nozzle end cover and a fuel nozzle insert. The fuel nozzle insert includes a first fuel nozzle insert portion and a second fuel nozzle insert portion, the first fuel nozzle insert portion being separately welded to the fuel nozzle end cover.

In another exemplary embodiment, a process of fabricating a fuel nozzle includes providing a fuel nozzle end cover, providing a fuel nozzle insert, and welding the fuel nozzle insert to the fuel nozzle end cover. The welding of the fuel nozzle insert to the fuel nozzle end cover is by a welding process selected from the group consisting of beam welding, solid state welding, and combinations thereof.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 2 is a schematic sectioned view of an exemplary fuel nozzle end cover and a first portion of a fuel nozzle insert arranged to be inserted into the fuel nozzle end cover according to the disclosure.

FIG. 3 is a schematic sectioned view of an exemplary fuel nozzle end cover with a first portion of a fuel nozzle insert welded into the fuel nozzle end cover according to the disclosure.

Wherever possible, the same reference numbers will be used throughout the drawings to represent the same parts.

DETAILED DESCRIPTION OF THE INVENTION

Provided is an exemplary fuel nozzle and a process of fabricating a fuel nozzle. Embodiments of the present disclosure permit fuel nozzles to be used for longer periods of time, permit fuel nozzles to be repaired in a simpler manner, permit fuel nozzles to be repaired more times (for example, more than three times), decrease operational costs of repair, prevent leaks in fuel nozzles, and combinations thereof.

Figure 1:
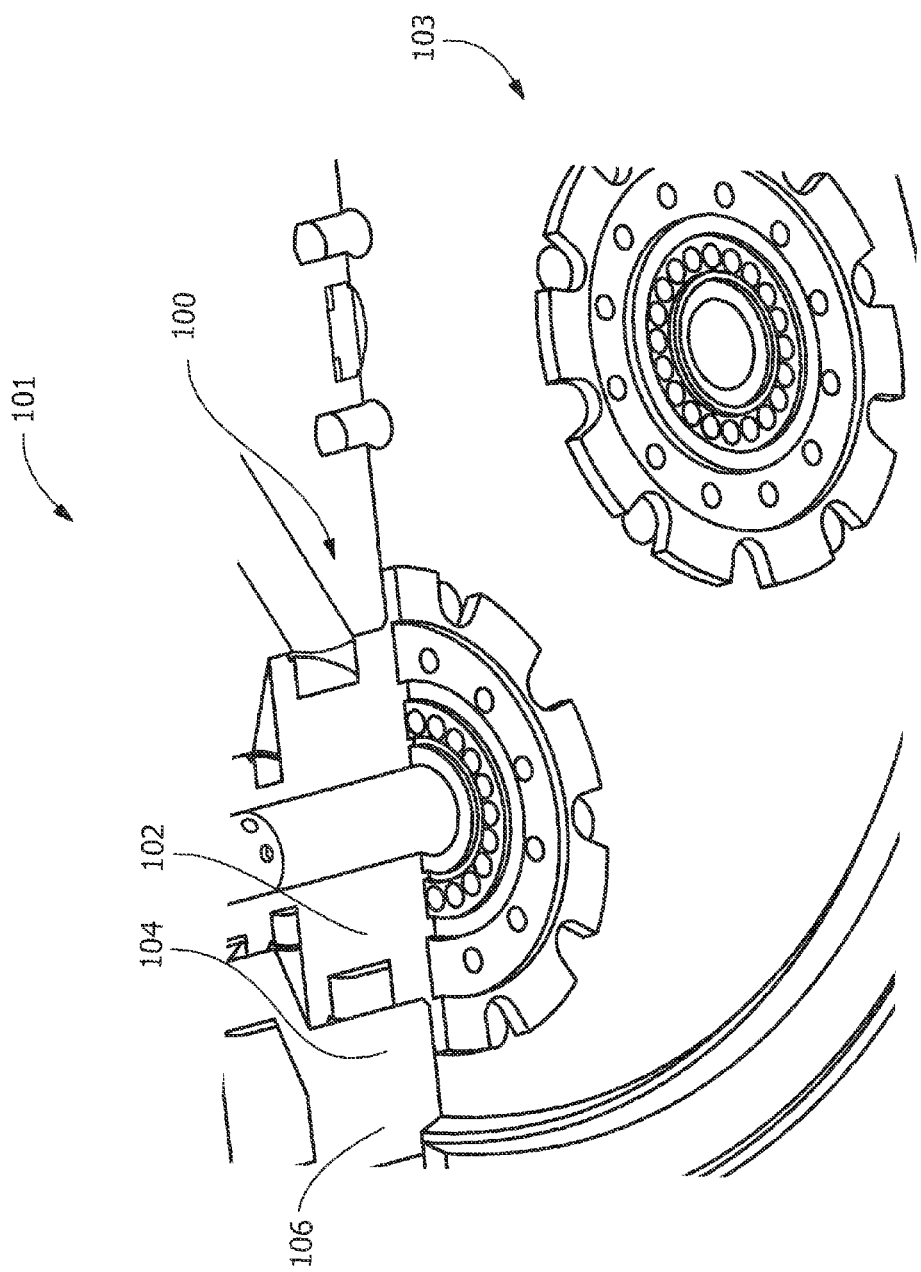
FIG. 1 is a cut-away perspective view of a fuel nozzle positioned in a gas turbine according to the disclosure with a portion of a fuel nozzle insert and a fuel nozzle end cover removed.

Referring to FIG. 1, in one embodiment, a fuel nozzle 100 includes a fuel nozzle end cover 104 and a fuel nozzle insert 102. The fuel nozzle insert 102 is welded to the fuel nozzle end cover 104 by a welding process, for example, the process shown and described below with reference to FIGS. 2-7. The welding of the fuel nozzle insert 102 to the fuel nozzle end cover 104 is by beam welding (such as laser beam welding and/or electron beam welding) and/or solid state welding (such as friction welding, friction stir welding, explosion welding, electromagnetic pulse welding, co-extrusion welding, cold welding diffusion welding, exothermic welding, high frequency welding, hot pressure welding, induction welding, and roll welding).

The fuel nozzle insert 102 is capable of being removably secured within the fuel nozzle end cover 104. The fuel nozzle 100 can be a portion of any suitable system. In one embodiment, the fuel nozzle 100 is arranged with one or more additional fuel nozzles 103 and/or is a portion of a gas turbine system 101.

Referring to FIG. 2, the fuel nozzle end cover 104 includes a base material 106 defining a cavity 110. The base material 106 is any suitable metal or metallic composition. In one embodiment, the base material 106 is or includes stainless steel.

The cavity 110 is any suitable geometry. In one embodiment, the cavity 110 includes substantially cylindrical portions bored out of the base material 106. In a further embodiment, the first cylindrical portion 112 has a first diameter 109 (for example, about 4 inches) that is larger than a second diameter 111 (for example, about 2.3 inches) of the second cylindrical portion 114, the first diameter 109 differing from the second diameter 111. In one embodiment, the first cylindrical portion 112 has a first depth 113 (for example, about 1.4 inches) and the second cylindrical portion 114 has a second depth 115 (for example, about 2.3 inches), the first depth 113 differing from the second depth 115. In a further embodiment, a frustoconical portion 116 separates the first cylindrical portion 112 and the second cylindrical portion 114.

In one embodiment, a first fuel nozzle insert portion 202 is configured for insertion along a first predetermined insertion direction 203, such as, into the fuel nozzle end cover 104 from the portion of the fuel nozzle end cover 104 proximal to the second cylindrical portion 114 and distal from the first cylindrical portion 112. In one embodiment, the first fuel nozzle insert portion 202 is or includes stainless steel. In one embodiment, the first fuel nozzle insert portion 202 includes a first region 204 that is substantially the same length as the depth 113 of the first cylindrical portion 112. In one embodiment, the first region 204 is substantially cylindrical with a first cylindrical protrusion 205 extending in the first predetermined insertion direction 203. The first fuel nozzle insert portion 202 also includes a second region 206 that corresponds with the frustoconical portion 116. In one embodiment, the second region 206 includes a recessed portion 207 and/or a protruding portion 209 arranged and disposed to be welded to the fuel nozzle end cover 104. The first fuel nozzle insert portion 202 also includes a third region 208 that is substantially the same length as the depth 115 of the second cylindrical portion 114. In the third region 208, the first fuel nozzle insert portion 202 includes a weld region such as a cladded build-up 210 (for example, a nickel-based cladding). In one embodiment, the cladded build-up 210 extends circumferentially around the third region 208 of the first fuel nozzle insert portion 202. In one embodiment, the cladded build-up 210 is circumferentially discontinuous.

Referring to FIG. 3, in one embodiment, the insertion of the first fuel nozzle insert portion 202 into the fuel nozzle end cover 104 includes welding of the cladded build-up 210 in the third region 208 of the first fuel nozzle insert portion 202 and welding of the protruding portion 209 to the fuel nozzle end cover 104, for example, between the frustoconical portion 116 and the second cylindrical portion 114.

Figure 4:
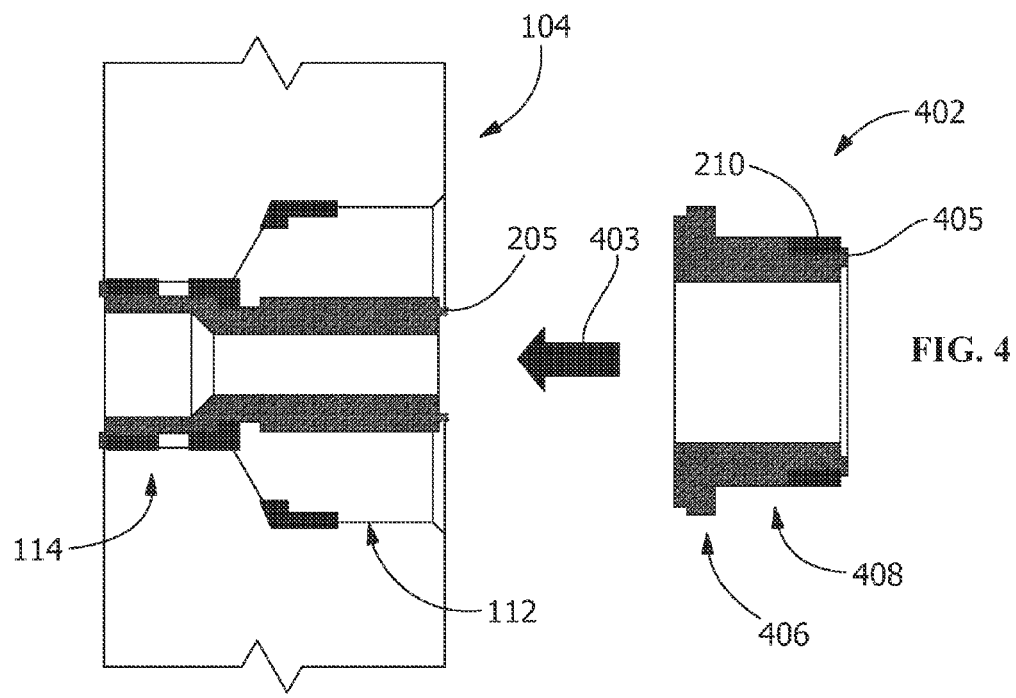
FIG. 4 is a schematic sectioned view of an exemplary fuel nozzle end cover with a first portion of a fuel nozzle insert welded into the fuel nozzle end cover and a second portion of the fuel nozzle insert arranged to be inserted into the fuel nozzle end cover according to the disclosure.

Referring to FIG. 4, in one embodiment, a second fuel nozzle insert portion 402 is configured for insertion in a second predetermined insertion direction 403, for example, a direction opposite the first predetermined insertion direction 203 (see FIG. 2) and/or from the portion of the fuel nozzle end cover 104 proximal to the first cylindrical portion 112 and distal from the second cylindrical portion 114. In one embodiment, the second fuel nozzle insert portion 402 is or includes stainless steel. In one embodiment, the second fuel nozzle insert portion 402 is substantially the same length as depth 113 of the first cylindrical portion 112. In one embodiment, the second fuel nozzle insert portion 402 includes a second cylindrical protrusion 405 concentric with the first cylindrical protrusion 205 upon insertion into the end cover 104. The second fuel nozzle insert portion 402 includes a wider region 406 arranged and disposed to be welded to the end cover 104, for example, by having an outer diameter (not shown) substantially equal to the first diameter 109 and the cladded build-up 210 on the end cover 104 and/or any other features within the cavity 110 of the end cover 104. The second fuel nozzle insert portion 402 also includes a narrower region 408 arranged and disposed for receiving a third fuel nozzle insert portion 602 (see FIG. 6), for example, by including a region having the cladded build-up 210.

Figure 5:
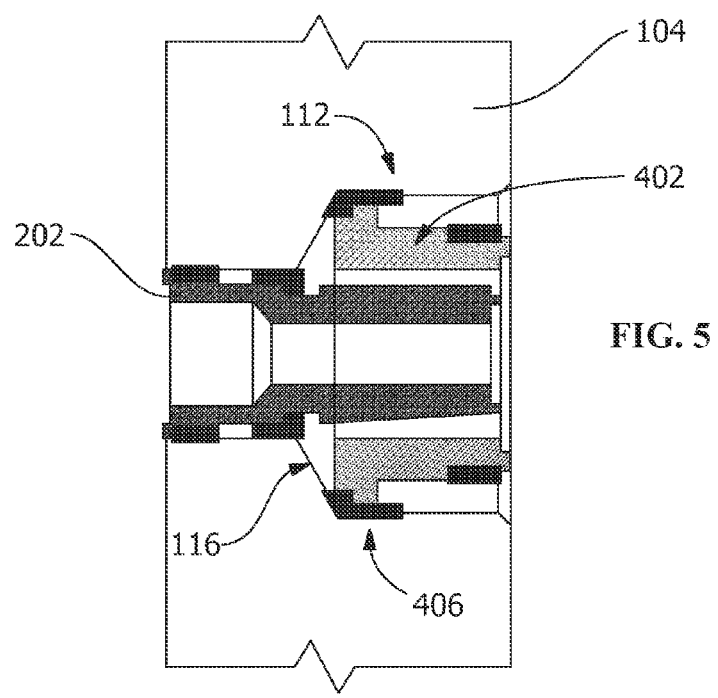
FIG. 5 is a schematic sectioned view of an exemplary fuel nozzle end cover with a first portion and a second portion of a fuel nozzle insert welded into the fuel nozzle end cover according to the disclosure.

FIG. 5 shows, in one embodiment, the second fuel nozzle insert portion 402 inserted into the fuel nozzle end cover 104 and around the first fuel nozzle insert portion 202. The second fuel nozzle insert portion is welded into the wider region 406 to the fuel nozzle end cover 104, for example, within the first cylindrical portion 112 and/or abutting the frustoconical portion 116.

Figure 6:
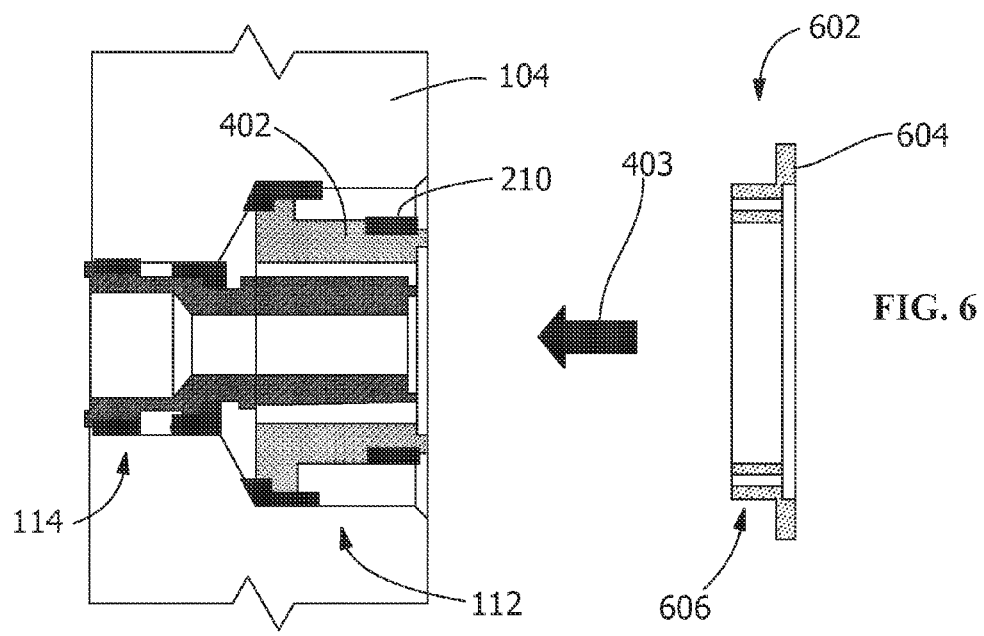
FIG. 6 is a schematic sectioned view of an exemplary fuel nozzle end cover with a first portion and a second portion of the fuel nozzle insert welded into the fuel nozzle end cover and a third portion of the fuel nozzle insert arranged to be inserted into the fuel nozzle end cover according to the disclosure.

Referring to FIG. 6, in one embodiment, the third fuel nozzle insert portion 602 is configured for insertion in the second predetermined insertion direction 403, for example, a direction opposite the first predetermined insertion direction 203 (see FIG. 2) and/or from the portion of the fuel nozzle end cover 104 proximal to the first cylindrical portion 112 and distal from the second cylindrical portion 114. In one embodiment, the third fuel nozzle insert portion 602 is or includes stainless steel. In one embodiment, the third fuel nozzle insert portion 602 is arranged and disposed to be inserted into the fuel nozzle end cover 104, around the second fuel nozzle insert portion 402, and/or to extend out of the fuel nozzle end cover 104, for example, forming a lip region 604. In one embodiment, the third fuel nozzle insert portion 602 includes an insertion region 606 configured to be welded to the cladded build-up 210 of the second fuel nozzle insert portion 402.

Figure 7:
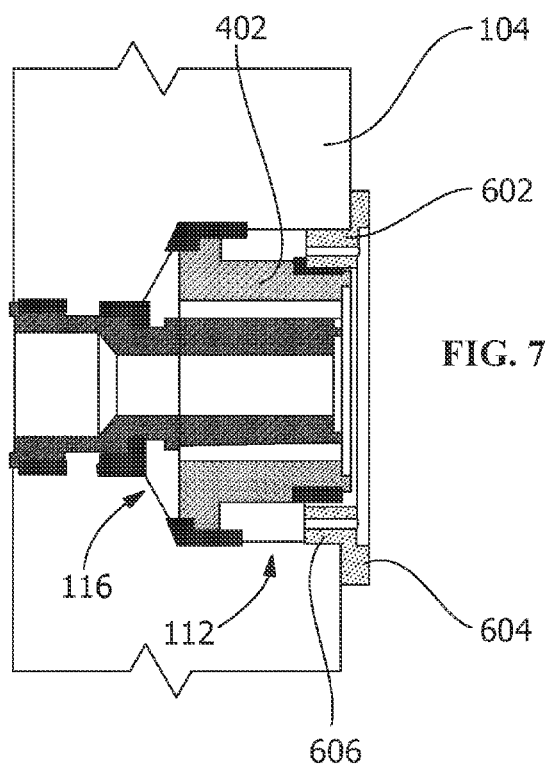
FIG. 7 is a schematic sectioned view of an exemplary fuel nozzle end cover with a first portion, a second portion, and a third portion of the fuel nozzle insert welded into the fuel nozzle end cover according to the disclosure.

Referring to FIG. 7, in one embodiment, the insertion of the third fuel nozzle insert portion 602 into the fuel nozzle end cover 104 and around the second fuel nozzle insert portion 402 includes welding of the insertion region 606 to the second fuel nozzle insertion portion 402 and/or to the fuel nozzle end cover 104, for example, within the first cylindrical portion 112 distal from the frustoconical portion 116.

The welding (such as to the first cylindrical portion 112, the second cylindrical portion 114, the frustoconical portion 116, the fuel nozzle end cover 104, the first fuel nozzle insert portion 202, the second fuel nozzle insert portion 402, and/or the third fuel nozzle insert portion 602) is direct or indirect. For example, in one embodiment, the welding is by the beam welding and/or the solid state welding described above as applied to the components with the cladded build-up 210 or directly between surfaces. In another embodiment, the welding is by the beam welding and/or the solid state welding through an intermediate material (not shown), such as a sleeve, an insert, a shim, another filler material, features on the fuel nozzle end cover 104, other suitable intermediate materials, or combinations thereof.

In one embodiment, one or more of the intermediate materials include a composition, by weight, of about 10% Ni, about 20% Cr, about 15% W, up to about 3% Fe, about 1.5% Mn, up to about 0.4% Si, about 0.10% C, incidental impurities, and a balance of Co. In one embodiment, at least one of the features 108 includes a composition, by weight, of about 0.005% C, 0.150% Mn, about 0.005% P, about 0.002% S, about 0.03% Si, about 15.50% Cr, about 16.0% Mo, about 3.50% W, about 0.15% V, about 0.10% Co, about 6.00% Fe, incidental impurities, and a balance of Ni. In one embodiment, at least one of the features 108 includes a composition, by weight, of about 0.015% C, about 0.48% Si, about 20% Cr, about 1.85% Mn, about 0.15% P, up to about 0.20% Cu, about 0.10% S, up to about 0.60% N, up to about 0.50% Mo, about 10.1% Ni, incidental impurities, and a balance of Fe.

Referring again to FIG. 2, in one embodiment, one or more of the intermediate materials is a feature 108 positioned within the cavity 110. The features 108 are arranged and disposed to facilitate removable securing of one or more of the first fuel nozzle insert portion 202, the second fuel nozzle insert portion 402 (see FIG. 4), and the third fuel nozzle insert portion 602 (see FIG. 6). For example, the features 108 extend into the cavity 110 forming concentric rings corresponding to one or more of the first fuel nozzle insert portion 202, the second fuel nozzle insert portion 402 (see FIG. 4), and the third fuel nozzle insert portion 602 (see FIG. 6).

The features 108 are positioned in any suitable arrangement. For example, in one embodiment, one or more of the features 108 is positioned within each of the first cylindrical portion 112 and the second cylindrical portion 114. In other embodiments, only one of the features 108 is positioned in each of the first cylindrical portion 112 and the second cylindrical portion 114. Additionally or alternatively, in one embodiment, one or more of the features 108 extend circumferentially around the cavity 110 through the first cylindrical portion 112 and/or the second cylindrical portion 114. In another embodiment, one or more of the features 108 are discontinuously circumferential within the cavity 110.

The features 108 and/or other intermediate materials are secured to the base material 106 by any suitable process. The securing of the features 108 to the base material 106 results in a predetermined microstructure (not shown) based upon the welding process utilized. The securing is performed by one or more of beam welding (such as laser and/or electron beam), friction welding, gas tungsten arc welding (such as tungsten inert gas welding), and gas metal arc welding (such as metal inert gas welding). In one embodiment, such as in embodiments with the securing being by beam welding, or friction welding, the predetermined microstructure includes a first heat affected zone proximal to the base material 106 that has a predetermined microstructure, a second heat affected zone between the first heat affected zone and a fusion zone, the fusion zone between the second heat affected zone and a third heat affected zone, the third heat affected zone between the fusion zone and a fourth heat affected zone, and the fourth heat affected zone between the third heat affected zone and the unaffected portions of the feature 108. In one embodiment, each of the zones has a different microstructure. As will be appreciated by those skilled in the art, other embodiments include characteristics distinguishing from techniques using brazing.

In one embodiment, securing of the features 108 to the base material 106 permits repeated insertion and removal of the insert 102 into the fuel nozzle end cover 104. For example, in one embodiment, the insert 102 is capable of being removed from the fuel nozzle end cover 104 with little or no damage to the fuel nozzle 100 at least a predetermined number of times, for example, more than three times, more than four times, more than five times, more than ten times, or more than any other suitable number of times.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fuel nozzle, comprising:
   a fuel nozzle end cover; and
   a fuel nozzle insert;
   wherein the fuel nozzle insert is welded to the fuel nozzle end cover by a welding process selected from the group consisting of beam welding, solid state welding, and combinations thereof, the fuel nozzle insert includes a first fuel nozzle insert portion and a second fuel nozzle insert portion, the first fuel nozzle insert portion being welded to a second cylindrical portion of the fuel nozzle end cover and the second fuel nozzle insert portion being welded to a first cylindrical portion of the fuel nozzle end cover, the first cylindrical portion and the second cylindrical portion differing in diameter; and the first fuel nozzle insert portion are configured for insertion along a first predetermined insertion direction and the second fuel nozzle insert portion is configured for insertion along a second predetermined insertion direction, the first predetermined insertion direction differing from the second predetermined insertion direction.

2. The fuel nozzle of claim 1, wherein the second fuel nozzle insert portion is also welded to a frustoconical portion between the first cylindrical portion and the second cylindrical portion.

3. The fuel nozzle of claim 1, wherein the fuel nozzle insert further includes a third fuel nozzle insert portion.

4. The fuel nozzle of claim 3, wherein the third fuel nozzle insert portion is welded to the second fuel nozzle insert portion.

5. The fuel nozzle of claim 4, wherein the third fuel nozzle insert portion forms a lip region outside of the fuel nozzle end cover.

6. The fuel nozzle of claim 1, wherein the fuel nozzle insert includes one or more cladded build-ups.

7. The fuel nozzle of claim 1, wherein the fuel nozzle insert includes a first fuel nozzle insert portion and a second fuel nozzle insert portion, the first fuel nozzle insert portion being separately welded to the fuel nozzle end cover.

8. The fuel nozzle of claim 1, wherein the fuel nozzle insert further includes a third fuel nozzle insert portion welded to the second fuel nozzle insert portion.

9. The fuel nozzle of claim 1, wherein the fuel nozzle end cover includes a stainless steel base material defining substantially cylindrical cavities, having a first diameter and a second diameter, the first diameter being larger than the second diameter, a first depth and a second depth, the first depth being smaller than the second depth, and a frustoconical portion separating the substantially cylindrical cavities.

10. A fuel nozzle, comprising:
    a fuel nozzle end cover; and
    a fuel nozzle insert;
    wherein the fuel nozzle insert includes a first fuel nozzle insert portion and a second fuel nozzle insert portion, the first fuel nozzle insert portion being separately welded to the fuel nozzle end cover;
    wherein the first fuel nozzle insert portion is configured for insertion along a first predetermined insertion direction and the second fuel nozzle insert portion is configured for insertion along a second predetermined insertion direction, the first predetermined insertion direction differing from the second predetermined insertion direction.

11. The fuel nozzle of claim 10, wherein the first fuel nozzle insert portion is welded to a first cylindrical portion of the fuel nozzle end cover and the second fuel nozzle insert portion is welded to a second cylindrical portion of the fuel nozzle end cover, the first cylindrical portion and the second cylindrical portion differing in diameter.

12. The fuel nozzle of claim 11, wherein the second fuel nozzle insert portion is also welded to a frustoconical portion between the first cylindrical portion and the second cylindrical portion.

13. The fuel nozzle of claim 1, wherein the fuel nozzle insert further includes a third fuel nozzle insert portion.

14. The fuel nozzle of claim 13, wherein the third fuel nozzle insert portion forms a lip region outside of the fuel nozzle end cover.

15. The fuel nozzle of claim 10, wherein the fuel nozzle insert includes one or more cladded build-ups.

16. A process of fabricating a fuel nozzle, comprising:
providing a fuel nozzle end cover;
providing a first fuel nozzle insert portion and a second fuel nozzle insert portion;
inserting the first fuel nozzle insert portion along a first predetermined insertion direction;
welding the first fuel nozzle insert portion to the fuel nozzle end cover;
inserting the second fuel nozzle insert portion along a second predetermined insertion direction, the first predetermined insertion direction differing from the second predetermined insertion direction; and
welding the second fuel nozzle insert to the fuel nozzle end cover;
wherein the welding of the first fuel nozzle insert portion and the second fuel nozzle insert portion are to the fuel nozzle end cover by a welding process selected from the group consisting of beam welding, solid state welding, and combinations thereof.

17. The process of claim 16, wherein the welding of the first fuel nozzle insert portion and the second fuel nozzle insert portion are separately welded to the fuel nozzle end cover.

* * * * *